United States Patent [19]

Becker et al.

[11] Patent Number: 5,031,478

[45] Date of Patent: Jul. 16, 1991

[54] TWO GEAR, CONNECTING ARM AND CRANK APPARATUS

[75] Inventors: Michael L. Becker, Akron; Henry D. Broyles, Uniontown; Kenneth D. Conger, Munroe Falls, all of Ohio; James M. Hart, Merl, Luxembourg; Arland A. Peck; Dean C. Testa, both of Akron, Ohio

[73] Assignee: The Goodyear Tire & Rubber Company, Akron, Ohio

[21] Appl. No.: 597,193

[22] Filed: Oct. 12, 1990

[51] Int. Cl.⁵ ............................................. F16H 35/02
[52] U.S. Cl. ........................................ 74/821; 74/393; 74/827; 475/14
[58] Field of Search ................. 74/384, 393, 821, 826, 74/827, 837; 475/14

[56] References Cited

U.S. PATENT DOCUMENTS

| | | | |
|---|---|---|---|
| 2,784,612 | 3/1957 | Liska | 74/827 |
| 2,825,243 | 3/1958 | Wrinkle | 475/14 X |
| 3,473,417 | 10/1969 | Peterson | 74/827 |
| 3,665,789 | 5/1972 | Fisher | 74/827 X |

Primary Examiner—Leslie A. Braun
Assistant Examiner—Scott Anchell
Attorney, Agent, or Firm—Frederick K. Lacher; T. P. Lewandowski

[57] ABSTRACT

Rotation and linear movement of a main gear is provided by a pinion gear rotatably mounted on a crank arm and in meshing engagement with the main gear. A connecting arm between the gear centers keeps the gears in meshing engagement. The pinion gear may have a diameter one half the diameter of the main gear to provide rotation of the main gear 180 degrees after one revolution of the pinion gear. The crank arm may be rotated in opposite directions to provide oscillating movement of the main gear. In a tire building machine, the main gear may be mounted in a linear guide of an upright plate member for vertical movement. The main gear is connected to a shaft for rotating and tilting a hub member having two spaced apart tire building drums mounted with axes at an angle of 90 degrees and in the same plane as the axes of the tire building drums so that they can be oscillated between two fabricating positions.

9 Claims, 5 Drawing Sheets

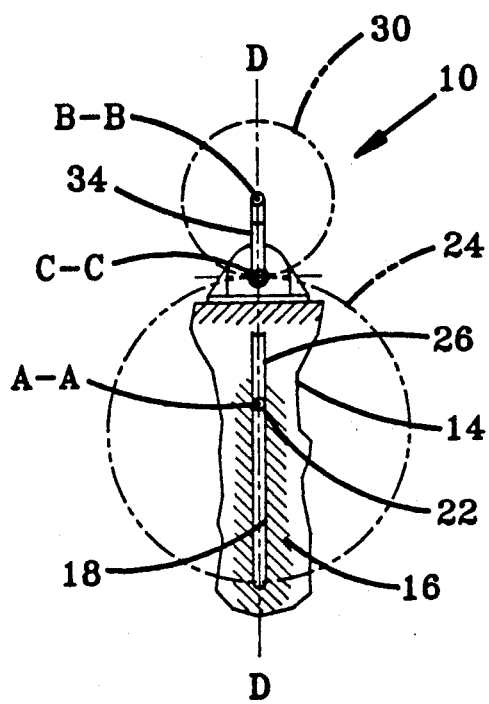
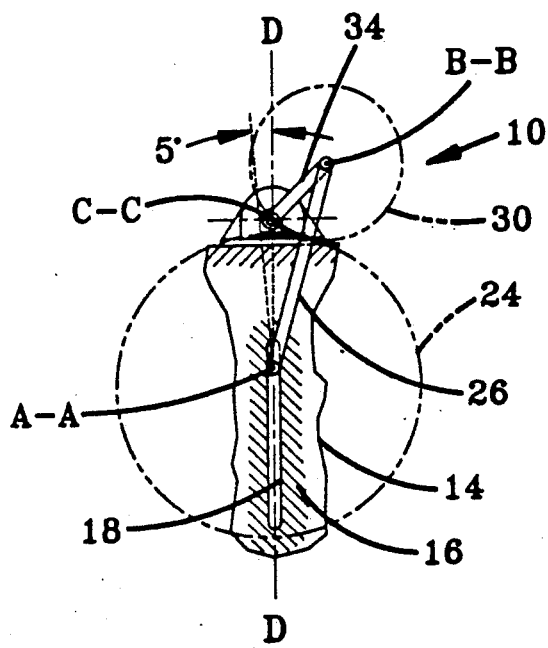
FIG-1  FIG-2
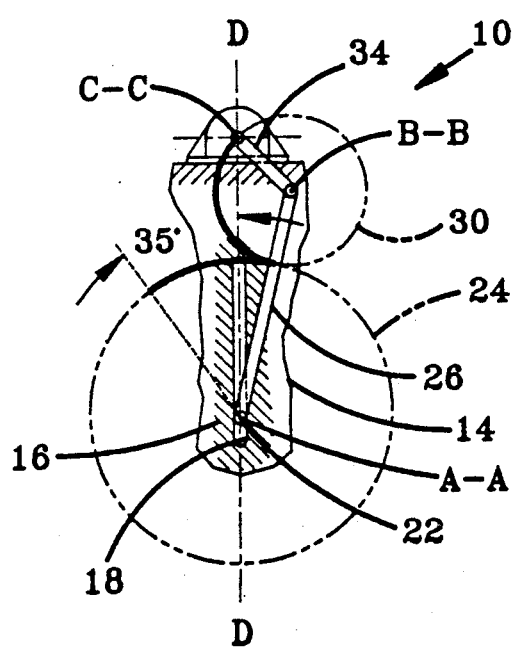
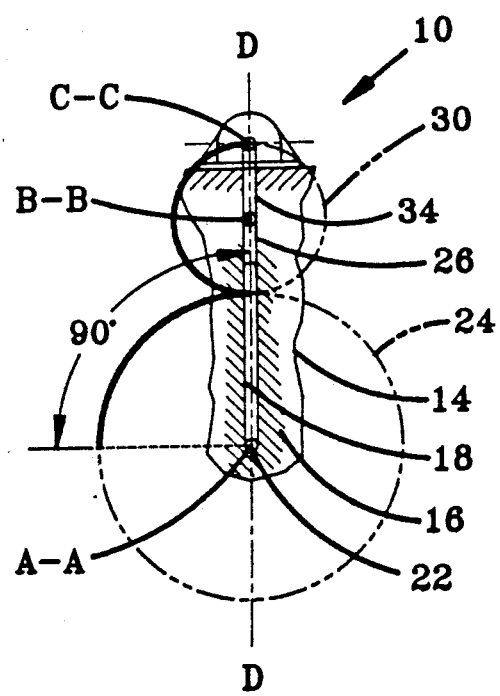
FIG-3  FIG-4

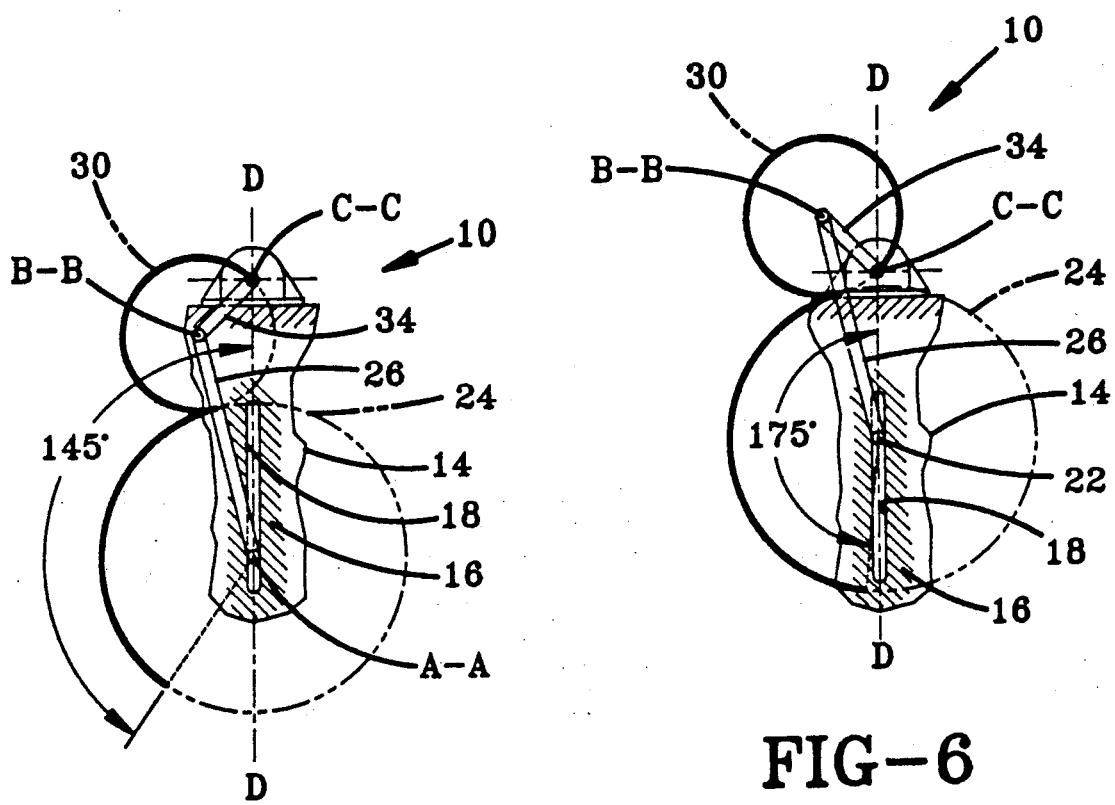
FIG-5
FIG-6
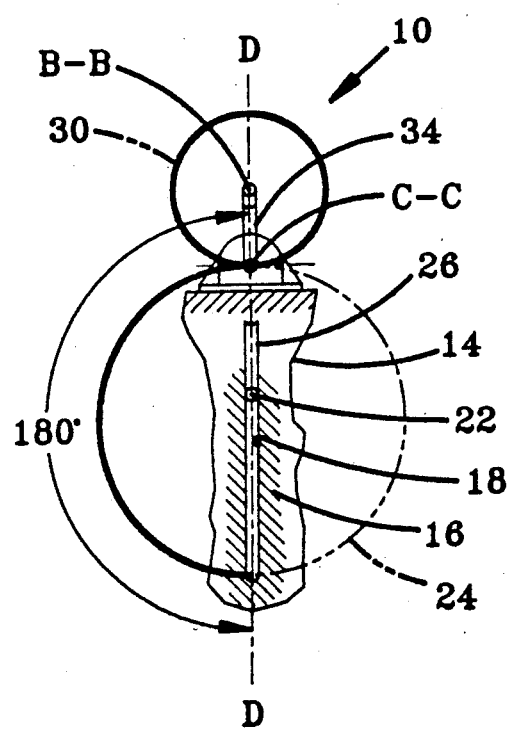
FIG-7

TWO GEAR, CONNECTING ARM AND CRANK APPARATUS

This invention relates to apparatus for rotating and tilting a shaft connected to a hub of a dual drum turret for a tire building machine. Two drums are mounted on the hub which is rotatable to oscillate the drums between a first tire fabricating position and a second tire fabricating position for applying first position components to a first drum. Then the drums are oscillated and the second position components including a belt overlay and tread are applied to the tire carcass on the first drum in the second tire fabricating position. At the same time, the first position components are being applied to the second drum in the first tire fabricating position to form a second tire carcass. The first tire carcass is finished and removed from the first drum after which the drums are oscillated and the process repeated.

During the oscillation of the drums, a hub is rotated. However, it is also tilted to avoid contact of the drums with the floor in front of the tire building machine. The two position process is described and shown in copending patent application entitled "Tire Building Apparatus and Method" which was assigned to the assignee of this application and was filed at the same time this application was filed. In the past a hub having three orthogonally oriented drums with axes in different planes has been proposed. However, not all the drums could be fully utilized. It was not possible to oscillate the drums which made it difficult to provide services to the drums.

With the apparatus of this invention, the axes of rotation of the drums and the hub are in the same plane so that the hub can be oscillated. The hub may also be tilted to avoid contact of the drums with the floor. In addition, the motion of the drums is accelerated smoothly from zero to a maximum and back to zero again to provide a smooth oscillating movement of the drums.

In accordance with one aspect of the invention, there is provided apparatus for rotation and linear movement of a body comprising a first gear having a first axis at a first gear center, a second gear connected to the body and being rotatable about a second axis parallel to the first axis at a second gear center, the first gear center being connected to a crank arm rotatable in a stationary bearing about a crank arm axis parallel to the first gear axis, a connecting arm extending between the first gear center and the second gear center with the first gear being in meshing engagement with the second gear, the second gear center having a slide member slidably mounted in a linear guide in the same plane as the crank axis whereby upon rotation of the crank arm, the first gear is rotated causing the second gear to rotate and the second gear center to be moved in the linear guide toward and away from the crank arm axis and thereby provide linear movement of the body.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts can be modified in numerous ways within the spirit and scope of the invention defined in the claims hereof.

IN THE DRAWINGS

FIGS. 1 through 7 are schematic drawings showing the rotation of the gears and the crank at increments during a complete revolution of the crank with the gear teeth areas which have been engaged being shown in heavy lines.

Figure 8:
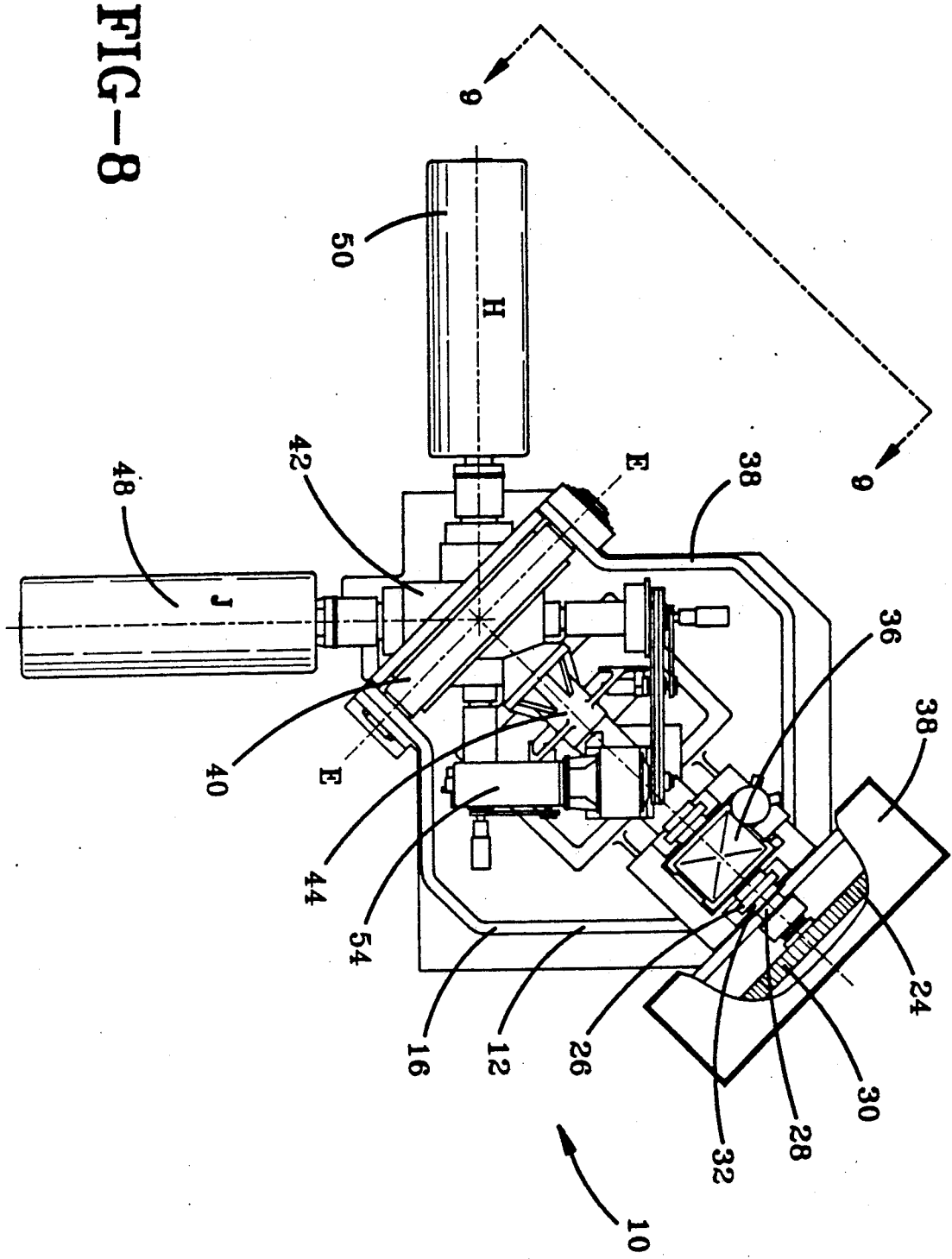
FIG. 8 is an enlarged plan view of a tire building machine turret embodying the invention.
Figure 9:
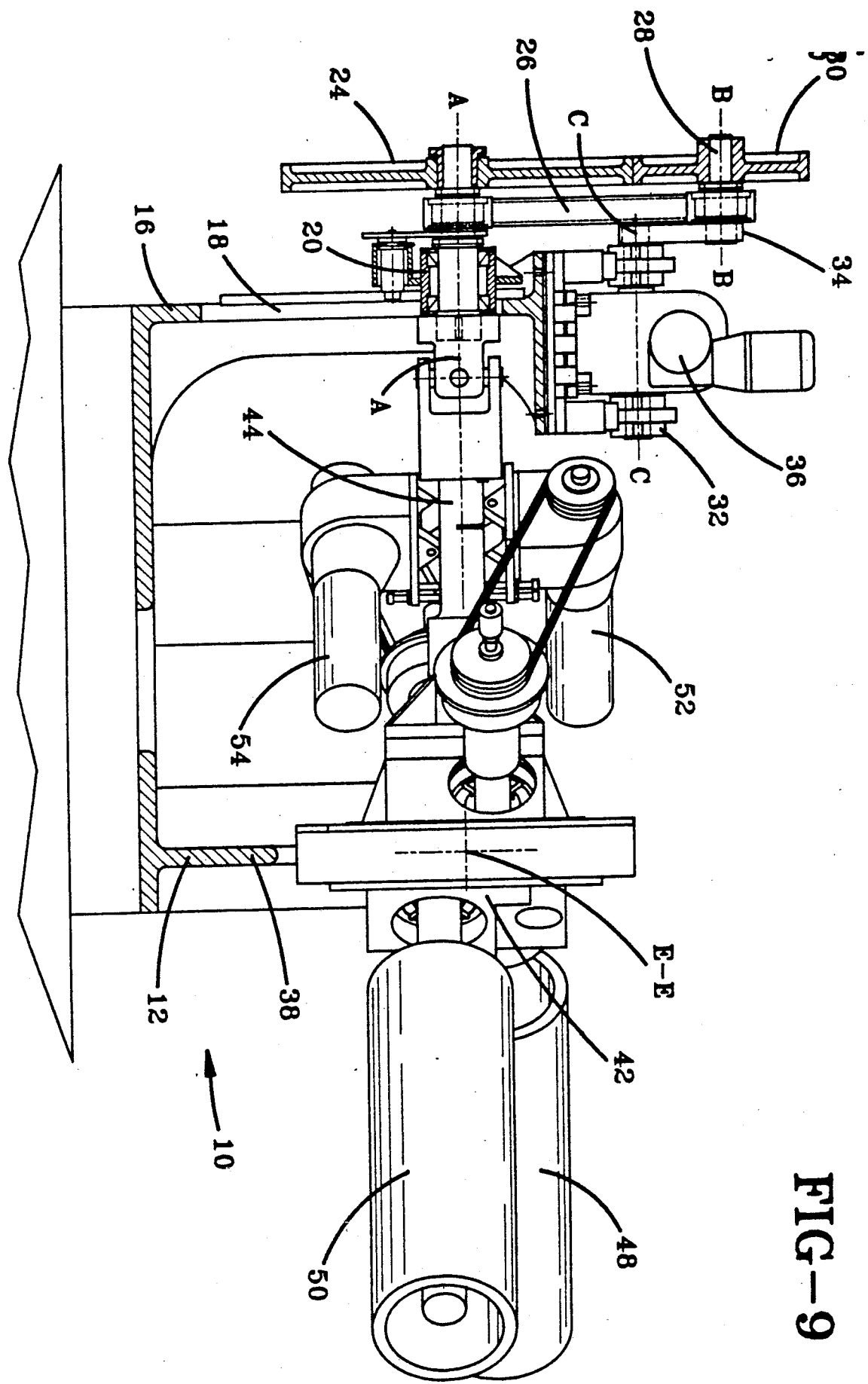
FIG. 9 is an elevation taken along the line 9—9 in FIG. 8 with parts being broken away.

With reference to FIGS. 8 and 9, a two gear connecting arm and crank apparatus 10 is shown mounted on a tire building machine turret 12 having a base 14. A rear portion of the base 14 such as upright rear plate 16 is generally vertical and includes a slide such as vertical linear guide 18. A slide member such as bearing block 20 is slidably mounted in the linear guide 18 and rotatably supports a stub shaft 22 connected to a main gear 24. A connecting arm 26 has one end pivotally mounted on the stub shaft 22 at a main gear center A—A and the other end pivotally mounted on a crank shaft 28 supporting a pinion gear 30 at a pinion gear center B—B. The crank shaft 28 is rotatably mounted in a stationary bearing member such as pillow block 32 having a crank axis C—C and being mounted on the rear plate 16. Preferably the crank axis C—C is in substantially the same plane D—D as the linear guide 18 and a crank arm 34 of the crank shaft 28 has a length substantially the same as the effective radius of the pinion gear 30. A motor reducer 36 is mounted on the rear plate 16 of the base 14 and is connected to the crank shaft 28 at the crank axis C—C for rotating the crank shaft.

Rotation of the crank shaft 28 in a clockwise direction around the crank axis C—C moves the pinion gear 30 in a clockwise direction as shown in FIGS. 1-7 causing the main gear 24 to rotate in a counter clockwise direction through predetermined angles as indicated by the heavy lines in the drawings. Simultaneously the stub shaft 22 and bearing block 20 are moved in a generally vertical direction in the linear guide 18. The diameter of the pinion gear 30 is less than the diameter of the main gear 24 and in this embodiment is one half the diameter of the main gear whereby the main gear is rotated 180 degrees after one revolution of the pinion gear on the crank arm 34. The angular movement of the pinion gear 30 and the main gear 24 is illustrated in FIGS. 1-7 by the heavy lines on the schematic pitch lines shown in dot-dot-dash lines at the pitch circle of the pinion gear and the main gear.

Both the sliding vertical motion of the bearing block 20 and the rotation of the main gear 24 accelerates smoothly from zero to a maximum value and back to zero again during the revolution of the pinion gear 30 at a constant angular speed. This provides a smooth operation without causing harmful stress on the apparatus.

At the front portion of the base 14, a front frame member 38 has a ring member 40 pivotally mounted for rotation about a generally horizontal axis E—E. The ring member 40 supports a hub member 42 for rotation about an axis of rotation in the ring member. A shaft 44 is mounted on the hub member 42 and extends rearwardly to a universal joint member 46 which may include a slip joint. The universal joint member 46 is mounted on the bearing block 20 which is slidably supported in the linear guide 18 of the rear plate 16.

A first tire building drum 48 and a second tire building drum 50 are rotatably mounted on the hub member 42 with the first tire building drum spaced from the second tire building drum and extending outwardly from the hub member with an axis of rotation at an angle F of about 90 degrees to the axis of rotation of the second tire building drum. The first tire building drum 48 and second tire building drum 50 have independent drive means 52 and 54, respectively, to effect rotation of the drums as required. Other means for expanding the drums 48 and 50 may also be provided.

As shown in FIGS. 1 and 9, the hub member 42 and shaft 44 are in a generally horizontal position with the crank shaft 28 in the vertical position extending upwardly from the crank axis C—C. The first tire building drum 48 is in a first position for application of first tire components on the drum. After application of the first components to provide a first tire carcass, the crank shaft 28 is rotated by the motor reducer 36 with the crank arm 34 moving in a clockwise direction as shown in FIGS. 2 through 7. This rotation moves the bearing block 20 vertically downward to the position shown in FIG. 4 and FIG. 10 with the main gear center A—A at the bottom of the linear guide 18 causing the shaft 44 to tilt the hub member 42 and rotate in the ring member 40 on the front frame member so that the tire building drum 50 clears the floor line G—G. Then as the crank arm 34 continues to rotate in the clockwise direction as shown in FIGS. 5 through 7, the bearing block 20 is raised to the same height as shown in FIG. 9 but with the first tire building drum 48 in position H shown in FIG. 8 and the second tire building drum 50 in position J shown in FIG. 8. Building of the tire carcass on the first tire building drum 48 may then be completed while the first position components are applied to the second tire building drum 50.

Figure 10:
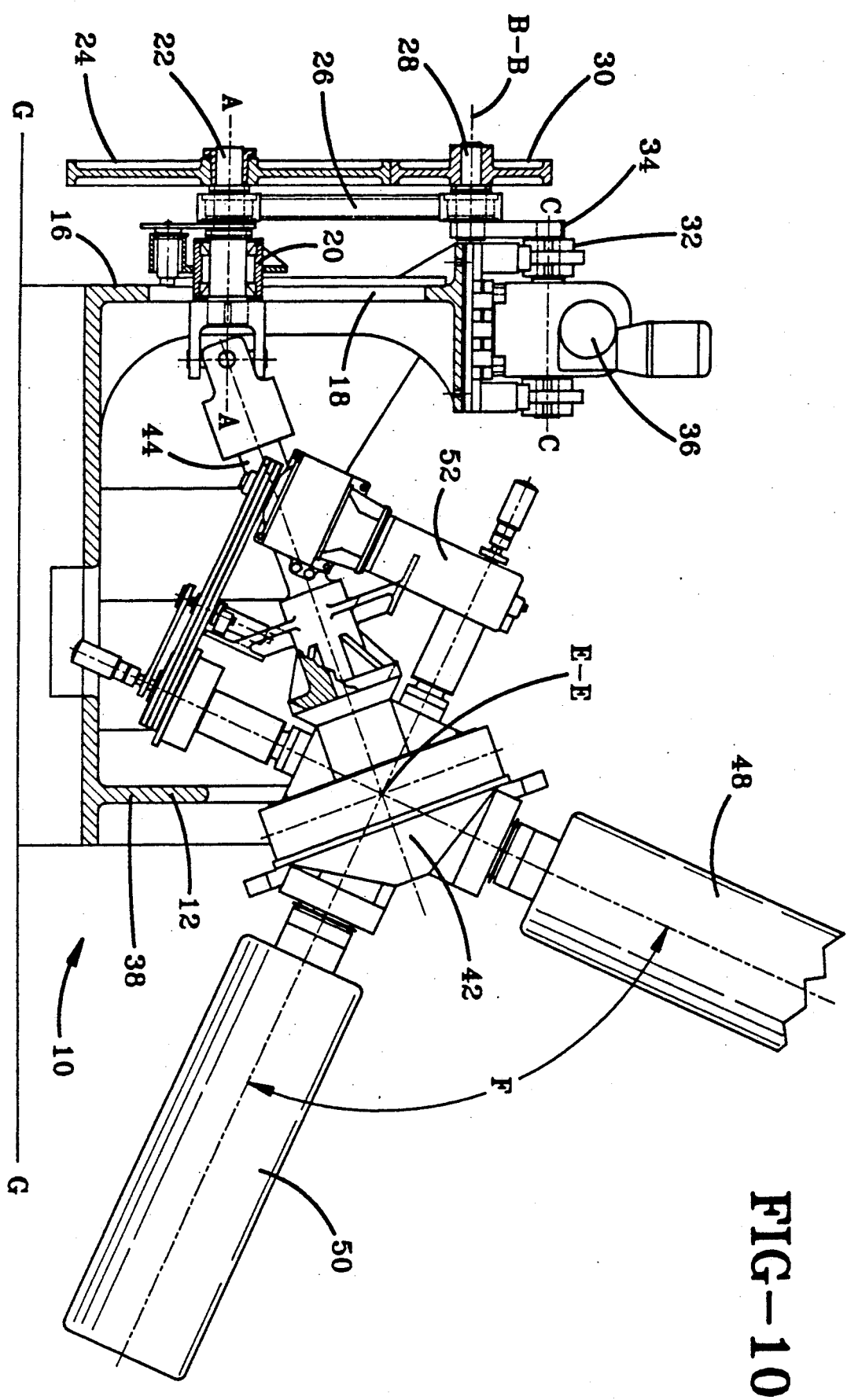
FIG. 10 is an elevation like FIG. 9 showing the hub in the tilted position and rotated 90 degrees to place the drums in the intermediate position between the tire fabricating positions.

After the tire carcass is completed in position H as shown in FIG. 8, it may removed from the drum. Then the second tire building drum 50 with the tire carcass formed by the first position components applied at position J may be returned to the position H shown in FIG. 8 by reversing the rotation of the crank shaft 28 and moving the crank arm 34 in a counter clockwise direction from the position shown in FIG. 7 to the position shown in FIG. 1. This rotates the shaft 44 through 180 degrees during which time the shaft is tilted causing the hub member 42 to tilt so that the second tire building drum 50 does not engage the floor line G—G as shown in FIG. 10. Then after the first tire building drum 48 and second tire building drum 50 reach the original positions as shown in FIGS. 1, 9 and 10, the tire carcass formed on the second tire building drum 50 can be completed and the first position components applied to the first tire building drum 48 to form a third tire carcass. By reversing the rotation of the hub member 42 and providing an oscillating movement of the first tire building drum 48 and second tire building drum 50, the service lines for air pressure and electricity can be connected directly to the drum mechanism. This is not possible with apparatus where the drums rotate in only one direction to provide different positions of the drums.

While a certain representative embodiment and details have been shown for the purpose of illustrating the invention, it will be apparent to those skilled in the art that various changes and modifications may be made therein without departing from the spirit or scope of the invention.

What is claimed is:

1. Apparatus for rotation and linear movement of a body comprising a first gear having a first axis at a first gear center, a second gear connected to said body and being rotatable about a second axis parallel to said first axis at a second gear center, said first gear center being connected to a crank arm rotatable in a stationary bearing about a crank arm axis parallel to said first gear axis, a connecting arm extending between said first gear center and said second gear center with said first gear being in meshing engagement with said second gear, said second gear center having a slide member slidably mounted in a linear guide in a common plane as said crank axis whereby upon rotation of said crank arm said first gear is rotated causing said second gear to rotate and causing said gear center to be moved in said linear guide toward and away from said crank arm axis whereby linear movement of said body is provided.

2. Apparatus in accordance with claim 1 wherein a diameter of said first gear is less than a diameter of said second gear whereby said second gear is rotated less than a complete revolution and said second gear center is returned to an initial position after one revolution of said crank arm.

3. Apparatus in accordance with claim 2 wherein the diameter of said first gear is one half the diameter of said second gear whereby said second gear is rotated 180 degrees after one revolution of said first gear and said crank arm.

4. Apparatus in accordance with claim 3 wherein said body is a shaft means connected to a hub member rotatably supported for rotation about a hub axis in a dual drum turret of a tire building machine, a first drum rotatably mounted on said hub member, a second drum rotatably mounted on said hub member at a position spaced from said first drum with a second drum axis of rotation extending outwardly from said hub member at an angle of about 90 degrees to a first drum axis of rotation and said first drum axis of rotation, said second drum axis of rotation and said hub axis being in a common plane to provide for interchangeable positioning of said first drum and said second drum.

5. Apparatus in accordance with claim 4 wherein said dual drum turret further includes a base member having a front portion and a rear portion, said hub member being rotatably supported for rotation in a ring member pivotally mounted at said front portion for tilting about a generally horizontal axis, said shaft means including a universal joint at said rear portion with a slip joint to compensate for tilting and rotation of said shaft means in operation.

6. Apparatus in accordance with claim 5 wherein a rear plate is mounted on said rear portion and includes said linear guide, and said shaft means includes said slide member connected to said universal joint.

7. Apparatus in accordance with claim 5 wherein said crank arm is rotatable one complete revolution in one direction for tilting and turning said hub member in one direction and then said crank arm is rotatable in an opposite direction for tilting and turning said hub member in an opposite direction to provide oscillation of said hub member so that services for said first drum and said second drum may be connected directly to drum mechanisms of said first drum and said second drum.

8. Apparatus in accordance with claim 1 including power means for rotating said crank arm.

9. Apparatus in accordance with claim 1 wherein said power means includes means to rotate said crank arm at a constant speed of rotation whereby said rotation of said second gear and said oscillating vertical motion is accelerated smoothly from zero to a maximum value and then decelerated to zero during one complete rotation of said crank arm.

* * * * *